May 20, 1941.  R. E. TOBEY  2,242,407

REFRIGERATION APPARATUS

Filed Oct. 19, 1939

WITNESSES:

INVENTOR
RAYMOND E. TOBEY
BY
ATTORNEY

Patented May 20, 1941

2,242,407

UNITED STATES PATENT OFFICE 2,242,407

REFRIGERATION APPARATUS

Raymond E. Tobey, Springfield, Mass., assignor to Westinghouse Electric & Manufacturing Company, East Pittsburgh, Pa., a corporation of Pennsylvania Application October 19, 1939, Serial No. 300,124

7 Claims. (Cl. 62—89)

My invention relates to refrigeration apparatus and particularly to refrigeration apparatus which includes a high humidity compartment for preserving foodstuffs which may be spoiled by dehydration.

It is an object of my invention to provide a refrigerator with a high humidity compartment in which the moisture contained in the compartment is controlled.

It is another object of my invention to prevent dripping of moisture on the foodstuffs contained in the high humidity compartment of a refrigerator.

It is a further object of my invention to provide a high humidity chamber in a refrigerator which is cooled primarily by condition of heat through the walls of the chamber and wherein small amounts of dry air are circulated through the chamber only when the moisture contained therein reaches a value where it might spoil foodstuffs or drip thereon.

Figure 1:
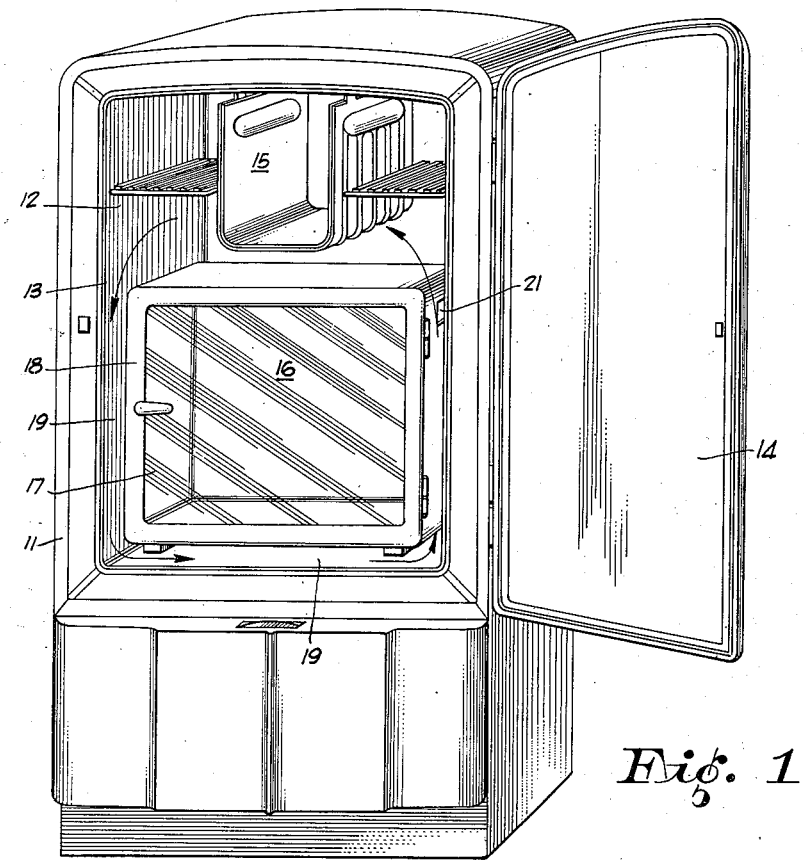
Figure 2:
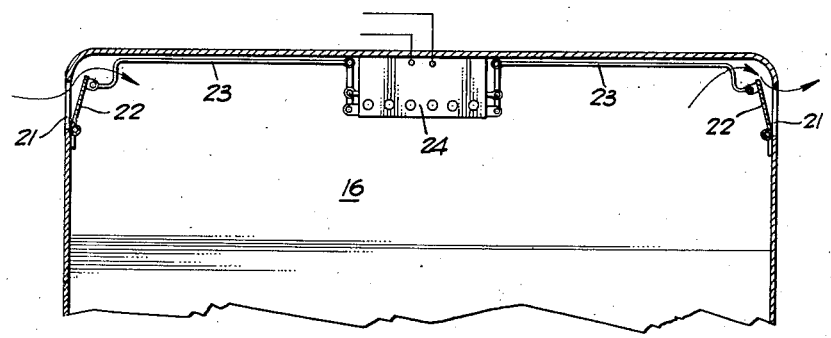

These and other objects are effected by my invention as will be apparent from the following description and claims taken in connection with the accompanying drawing forming a part of this application, in which:

Fig. 1 is a front elevational view of a refrigerator embodying my invention; and, Fig. 2 is a fragmentary sectional view of the top of the high humidity chamber shown in Fig. 1.

Referring specifically to the drawing for a detail description of my invention, numeral 11 designates, generally, a refrigerator cabinet including a heat insulated compartment 12 having an access opening 13 and a main heat insulated door 14 for closing the access opening 13. A cooling element or evaporator 15 of the conventional sheet metal type is disposed adjacent the top of the compartment 12 and refrigerant is circulated therethrough by any suitable refrigeration mechanism (not shown). A high humidity chamber 16 disposed beneath the evaporator preferably includes a five-sided box formed of a material of good heat conductivity, for example, porcelainized carbon steel, and is provided with an access opening 17 registering with the main access opening 13. An auxiliary door 18, preferably formed of glass, tightly seals the access opening 17 so that the high humidity chamber 16 is substantially totally enclosed. The chamber 16 is spaced from the sides and bottom of the compartment 12, as shown at 19 in Fig. 1. As shown in Fig. 2, the sides of the high humidity chamber 16 are provided with small openings 21 which are opened or closed by dampers 22 which are operated through rods 23 connected to a conventional solenoid operated humidostat 24.

The cooling element or evaporator 15 is normally maintained at below freezing temperatures and cools and circulates the air in the compartment 12 as shown, for example, by the arrows in Fig. 1. The cooling element dehydrates the circulated air by abstracting and freezing moisture therefrom and the cool, dry air contacts the top of the high humidity chamber 16 and is circulated through the spaces 19, thus contacting the sides, back and bottom of the chamber 16. The air in the high humidity chamber 16 is, therefore, cooled primarily by conduction of heat through the steel walls thereof and, because of the extended heat transfer surface which maintains the air in the chamber 16 at a temperature only slightly below the temperature of the extended surface, a relatively high humidity is maintained therein. Foodstuffs which which may be spoiled by excessive dehydration, such as vegetables and foods containing moisture which are kept in open containers, may be safely preserved in the high humidity chamber 16, at refrigerated temperatures.

However, some foodstuffs are deleteriously affected by humidities which are too high, and many foodstuffs are rendered inedible if moisture drips on them. Dripping may occur if the humidity in chamber 16 becomes too high and collects on the top wall thereof, where it is most likely to collect since the top wall is the coldest wall of the chamber 16, because of its proximity to the cooling element 15. In order to prevent excessive moisture from collecting in the compartment 16, when the humidity in the chamber 16 reaches a predetermined high value, such as 80 to 85 percent relative, the humidostat 24 opens the dampers 22, thus effecting a circulation of dry air from compartment 12 through chamber 16. The dry air absorbs some of the moisture from the chamber 16 and deposits it on the evaporator 15, which is, of course, periodically defrosted. When the humidity is again reduced to a safe value, the humidostat 24 closes the dampers 22. It will be understood that forms of humidity or moisture responsive devices other than the humidostat 24 may be utilized, the object being to prevent the humidity in the chamber 16 from reaching a value where dripping may occur or where some foodstuffs may spoil.

From the foregoing it will be apparent that I have provided improved refrigeration apparatus embodying a high humidity compartment primarily cooled by conduction of heat through the walls thereof with provision for a small circulation of dry air therethrough at times when the relative humidity or moisture content becomes too high.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In refrigeration apparatus, the combination of a refrigerator cabinet, a relatively low temperature cooling element for abstracting heat from the air in said cabinet which circulates into contact with the cooling element, said cooling element also abstracting moisture from the air in said cabinet, a substantially enclosed chamber disposed in said cabinet, a substantial part of which is formed of a material of good heat conductivity, said chamber being cooled primarily by conduction of heat through said material to said circulated air so that a relatively high humidity is maintained therein, and means for controlling the amount of moisture in said chamber, said means comprising movable dampers which afford circulation through said chamber of relatively small amounts of the dry air which contacts said cooling element to withdraw moisture from said chamber and deposit it on the cooling element when the humidity in said chamber is too high, and moisture responsive means for operating said dampers.

2. In refrigeration apparatus, the combination of a refrigerator cabinet, a relatively low temperature cooling element for abstracting heat from the air in said cabinet which circulates into contact with the cooling element, said cooling element also abstracting moisture from the air in said cabinet, a substantially enclosed chamber disposed in the cabinet, a substantial portion of which is formed of a material of good heat conductivity, said chamber being cooled primarily by conduction of heat through said material to said circulated air, so that a relatively high humidity is maintained therein, and means for controlling the amount of moisture in said chamber comprising a moisture responsive means for affording slight circulation through said chamber of the dry air which contacts said cooling element.

3. In refrigeration apparatus, the combination of a refrigerator cabinet embodying a heat insulated compartment, a relatively low temperature cooling element located in the upper portion of said compartment for abstracting heat and moisture from the air therein which circulates into contact with the cooling element, a substantially closed chamber located in the compartment below said cooling element, a substantial part of which is formed of a material of good heat conductivity, said chamber being cooled primarily by conduction of heat through said material to said circulated air, so that a relatively high humidity is maintained in said chamber, and moisture responsive means for affording restricted circulation of said dry circulating air through said chamber to control the amount of moisture therein.

4. In refrigeration apparatus, the combination of a refrigerator cabinet embodying a heat insulated compartment, a relatively low temperature cooling element located in the upper portion of said compartment for abstracting heat and moisture from the air therein which circulates into contact with the cooling element, a substantially closed chamber located in the compartment below said cooling element, a substantial part of which is formed of a material of good heat conductivity, said chamber being cooled primarily by conduction of heat through said material to said circulated air, so that a relatively high humidity is maintained in said chamber, and moisture responsive means for affording restricted circulation of said dry circulating air through said chamber to control the amount of moisture therein, said moisture responsive means including a humidostat and a damper associated with said chamber and operated by the humidostat.

5. In refrigeration apparatus, the combination of a refrigerator cabinet embodying a heat insulated compartment, a relatively low temperature cooling element located in the upper portion of said compartment for abstracting heat and moisture from the air therein which circulates into contact with the cooling element, a substantially closed chamber located in the compartment below said cooling element, a substantial part of which is formed of a material of good heat conductivity, said chamber being cooled primarily by conduction of heat through said material to said circulated air, so that a relatively high humidity is maintained in said chamber, and moisture responsive means for affording restricted circulation of said dry circulating air through said chamber to control the amount of moisture therein, said moisture responsive means including a humidostat and a damper associated with said chamber operated by the humidostat, said humidostat and damper being so arranged that the damper is normally closed and is opened by the humidostat when the moisture in said chamber reaches a relatively high value.

6. In refrigeration apparatus, the combination of a refrigerator cabinet including a substantially cube-shaped food storage compartment embodying top, side, rear and bottom walls with a door closing the front thereof, a relatively low temperature cooling element for abstracting heat from the air in the food storage compartment which comes into contact with said cooling element, said cooling element also abstracting moisture from the air in the food storage compartment which comes into contact therewith, a substantially closed cube-shaped chamber formed at least in part of a material providing a small thermal drop therethrough and embodying top, side, rear and bottom walls and a door for closing the front thereof, said chamber being disposed beneath the cooling element and closely adjacent to the side, bottom and rear walls of the food storage compartment to form relatively narrow air circulating passages around the sides, bottom and rear of said closed chamber through which cold dry air which has contacted the cooling element is circulated, whereby extending areas of said closed chamber are substantially uniformly cooled primarily by the conduction of heat therethrough to the cold dry air circulated through said passages and a high relative humidity is maintained therein, and means affording a circulation of relatively small amounts of said dry air through the chamber to absorb moisture therefrom and to maintain the humidity at a desired value.

7. In refrigeration apparatus, the combination of a refrigerator cabinet including a substantially cube-shaped food storage compartment embodying top, side, rear and bottom walls with a door closing the front thereof, a relatively low temperature cooling element for abstracting heat from the air in the food storage compartment which comes into contact with said cooling element, said cooling element also abstracting moisture from the air in the food storage compartment which comes into contact therewith, a substantially closed cube-shaped chamber formed at least in part of a material providing a small thermal drop therethrough and embodying top, side, rear and bottom walls and a door for closing the front thereof, said chamber being disposed beneath the cooling element and closely adjacent to the side, bottom and rear walls of the food storage compartment to form relatively narrow air circulating passages around the sides, bottom and rear of said closed chamber through which cold dry air which has contacted the cooling element is circulated, whereby extending areas of said closed chamber are substantially uniformly cooled primarily by the conduction of heat therethrough to the cold dry air circulated through said passages and a high relative humidity is maintained therein, and means affording a circulation of relatively small amounts of said dry air through the chamber to absorb moisture therefrom and to maintain the humidity therein at a desired value, said means comprising dampers which are opened when the relative humidity in said chamber becomes too high.

RAYMOND E. TOBEY.

CERTIFICATE OF CORRECTION.

Patent No. 2,242,407.  May 20, 1941.

RAYMOND E. TOBEY.

It is hereby certified that error appears in the printed specification of the above numbered patent requiring correction as follows: Page 1, first column, line 16, for the word "condition" read --conduction--; and that the said Letters Patent should be read with this correction therein that the same may conform to the record of the case in the Patent Office.

Signed and sealed this 22nd day of July, A. D. 1941.

(Seal)

Henry Van Arsdale,
Acting Commissioner of Patents.